F. B. DAVIS.
Nut-Lock.
No. 223,219.                Patented Jan. 6, 1880.
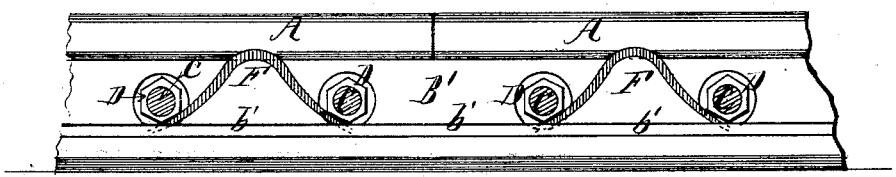
Fig. 1.
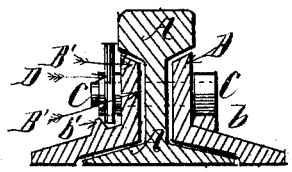
Fig. II.
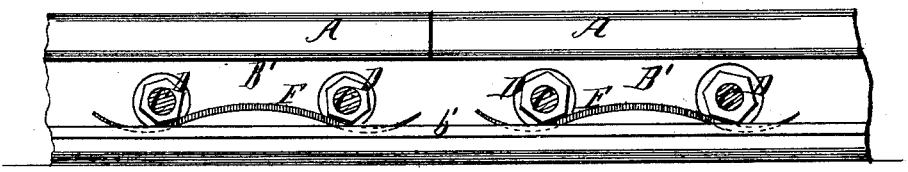
Fig. III.
Witnesses:
Ch. Riegleman
F. B. Swift
Inventor:
Frank B. Davis,
Per:
J. Barritt
Atty.

UNITED STATES PATENT OFFICE.

FRANK B. DAVIS, OF JOHNSTOWN, PENNSYLVANIA, ASSIGNOR TO CAMBRIA IRON COMPANY.

NUT-LOCK.

SPECIFICATION forming part of Letters Patent No. 223,219, dated January 6, 1880.

Application filed May 14, 1879.

*To all whom it may concern:*

Be it known that I, FRANK B. DAVIS, of Johnstown, Cambria county, State of Pennsylvania, have invented a new and Improved Nut-Lock; and I do hereby declare that the following is a clear and exact description of the same, reference being had to the accompanying drawings, forming a part of this specification.

The object of my invention is to provide for a simple and effective device for preventing nuts from getting loose by accidentally turning and unscrewing of the bolt.

To describe my invention more fully, I refer to the accompanying drawings, of which—

Figure I represents a side view of a rail-joint with my improvement applied, and showing the key just inserted. Fig. II is a cross-section of the same. Fig. III is a side view, showing the key hammered down.

A are the rails. B B' are the splice-bars, one on each side, securing the two rails together by means of the bolts C and nuts D.

The bolts C are kept from turning in the holes made for them through the splice-bars and rail by being made to rest with one side of the bolt-head flush, or nearly so, against or upon a rib or shoulder, $b$, formed upon or attached to the splice-bar B, as seen in Fig. II.

The splice-bar or fish-plate B' is provided with a similar rib, $b'$, preferably formed on the bar in the rolling, like the rib $b$, either continuous or at intervals; or the rib or shoulder $b b'$ may be formed upon a washer, E, held on the bolt C by the nut D, and resting, to prevent its turning, on the flange of the rail or of the splice-bar.

The distance between the bolt-hole and the rib $b'$ should be large enough to allow of the nut D being turned on the bolt C.

Between one of the sides of the nut and the rib $b'$ is inserted the ends of the wedge-key, as shown in Fig. I.

The key is made of a semi-round rod of soft steel, (rolled,) and is bent into the shape shown in Fig. I.

After the key has been inserted under the nuts, as shown in Fig. I, it is then hammered down, as shown in Fig. III.

I am aware that the same result can be produced by means of a single wedge-key inserted under each nut, and having its end bent upward to prevent it from accidentally withdrawing.

I am also aware that the same result can be accomplished by means of a rod passing under all the nuts and having the outer ends turned upward like the single wedges.

Having thus described my invention, I desire to claim—

The bent wedge-piece F, jointly with the nuts of two adjacent bolts that bind together the fish-plates and rails, as set forth.

FRANK B. DAVIS.

Witnesses:
   J. H. GEER,
   A. MONTGOMERY.